July 22, 1947. M. J. MEYER 2,424,409
BALL-AND-SOCKET JOINT FOR CONTROL TRANSMISSIONS
Filed May 25, 1939

Inventor,
M. J. Meyer
By: Glascock Downing & Seebold
Attys.

UNITED STATES PATENT OFFICE 2,424,409

BALL-AND-SOCKET JOINT FOR CONTROL TRANSMISSIONS

Michel Joseph Meyer, Paris, France; vested in the Attorney General of the United States Application May 25, 1939, Serial No. 275,747
In France May 30, 1938

Sections 3 and 14, Public Law 690, August 8, 1946.
Patent expires May 30, 1958

4 Claims. (Cl. 287—87)

The present invention has for object a system of ball-and-socket joints serving to connect control members and generally speaking for all applications.

The various ball-and-socket joint systems commonly used as method of articulation, particularly in the controls of auxiliary movements present, in their applications, inconveniences which are obviated by the ball-and-socket joint system forming the subject-matter of the present patent.

For instance, in the common case which consists in connecting two rods transmitting a longitudinal stress to members moving in different planes, it is established that the actual method consisting in connecting said rods by a transverse finger having a spherical part, generates torsional and bending stresses abnormally straining the parts concerned and creating lateral reactions prejudicial to satisfactory operation. Moreover, these arrangements cannot allow said ball-and-socket joints to function according to an angle sufficiently important for satisfying the requirements of many cases.

Besides this, said ball-and-socket joints are not always provided with the indispensable arrangement for taking up the play, and which must be, in these circumstances, easily adjustable; also, they do not present the advantage of being positively unable of getting out of order. Moreover, they lack, above all things, the indispensable advantage of being rapidly and easily coupled and uncoupled involving complete accessibility.

The present ball-and-socket joint system remedies these inconveniences and has other advantages: it ensures a rational transmission of the stress by eliminating the lateral coupling as well as the prejudicial reactions resulting therefrom, it directly transmits the stress through the axis of the rods carrying the ball-and-socket joint. The spherical part of the ball-and-socket joint located at the end of said rods, constitutes the point about which said rods can pivot in all possible planes up to a maximum amplitude encircling half the spherical part. Said system allows of obtaining rectilinear controls, as the axes of the elements ball and rods can be in alignment with each other; likewise, it allows of obtaining lateral control, so-called right-angular control, under a very large leading angle.

Said ball-and-socket joint system resides in the principle of gripping the male spherical part by means of suitable jaws belonging to the corresponding female part. There are two methods of spacing apart and gripping said jaws which can be obtained either automatically, or by hand, and the movement of said jaws takes place in a plane at right angles to the longitudinal axis of thrust, or axis of the rods, so as to laterally encircle as largely as possible, the periphery of the spherical part contrarily to the actual method of procedure, in which these spherical joints are carried at the end, that is to say in the axis of the rods.

In the accompanying drawing, the representation of which is given merely by way of indication, it will be noted that the gripping method of said jaws consists in causing said jaws to move circularly, by hand, by means of a simple knob and the action of a spring.

Figure 1:
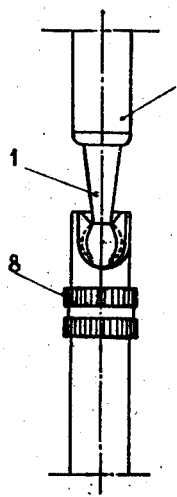
Fig. 1 illustrates an external view of the ball-and-socket joint having circular jaws.

The ball-and-socket joint having circular jaws is composed of the two main parts to be connected: on the one hand, the finger 1 having a spherical end 2 rigid with its control member, in this case, the rod 3; on the other hand: the part which receives the spherical end of said finger and which is constituted by a sheath 4 also rigid with the control member 5. Within said sheath is secured a jaw 6 having a spherical cavity, forming one with the same.

Opposite this fixed jaw is arranged a circular movable jaw 7 having a spherical cavity, capable of moving circularly under the action of an outer milled ring 8, to which it is connected by a pin 9 passing through the sheath through a circular opening 10; a torsional spring 11 placed within said sheath restores the circular jaw 7 to its locking position.

Figure 2:
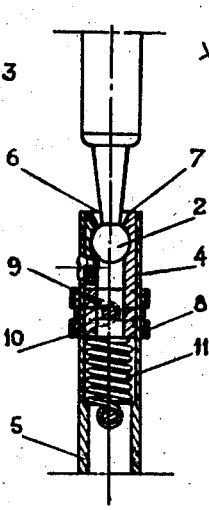
Fig. 2 is a longitudinal section of said pincers showing the method for coupling both parts united.
Figure 3:
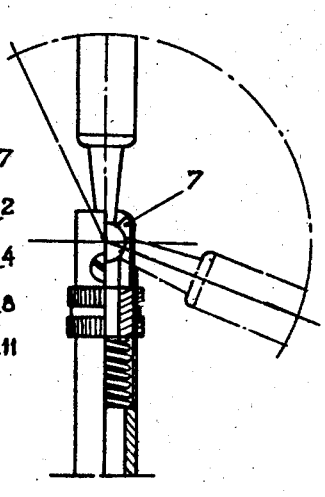
Fig. 3 is a complementary view of the two first ones showing an external half-view and half-section.
Figure 4:
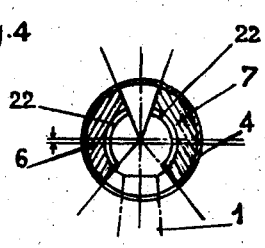
Fig. 4 is a cross section on an enlarged scale, showing the detail of a coupling member called circular jaw, in its closing and locking position.
Figure 6:
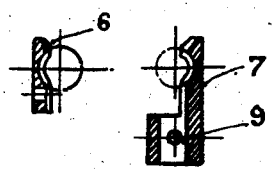
Fig. 6 is a longitudinal section of a fixed jaw.
Figure 8:
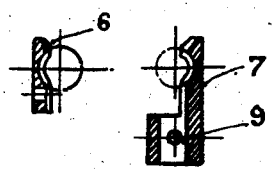
Fig. 8 is a longitudinal section of a movable jaw.
Figure 5:
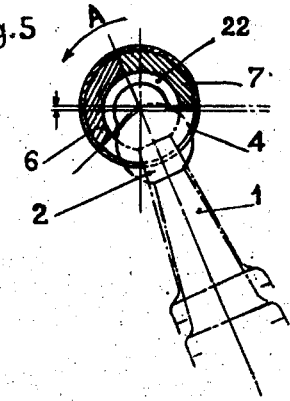
Fig. 5 is a similar view but showing said member in "open" position during uncoupling.
Figures 7, 9:
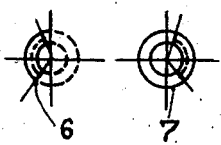
Fig. 7 is a plan view of said jaw.
Fig. 9 is a plan view.

The operation which consists in connecting the said control elements is very simple, as well as that consisting in uncoupling them. In these "circular jaws" it suffices to rotate the movable ring 8 in the direction of the arrow A to bring the movable jaw 7 from the position shown in Fig. 4 to the spaced position shown in Fig. 5, the spherical part 2 of the latter, once placed in its recess, it suffices to abandon the ring 8, which, under the action of the spring 11, Fig. 2, is restored in the reverse direction to that of the arrow, that is to say, to the position shown in Fig. 4; at this moment, the finger is trapped between both jaws 6 and 7 and cannot possibly become released therefrom.

For ensuring perfect adhesion of the spherical walls of the circular jaws on the spherical part, and consequently for eliminating play, the central recess of the spherical part 22 is slightly out of center relatively to the external diameter of said jaws; it will be seen that, under the action of the spring 11, the latter grip said spherical part with a normal pressure which automatically ensures the taking up of the play, as well as a safety locking of said spherical part.

It is to be noted that all these improvements are thus united in a simple member of relatively reduced cumbersomeness, which constitutes, among others, one of its main characteristic features.

This system can be applied to all controls by means of levers, links, coupling rods, segment controls, remote controls, and, in short, to all transmission controls which are particularly included in: machine-tools, motor cars, aviation, electric apparatus.

I claim:

1. A ball and socket joint for a pair of control rods one of which is manually operated, including a male element in the form of a spherical member at the end of the manually operated control rod, a female element for receiving the male element fixed at the end of the other control rod and including fixed and movable jaw members, each of said jaw members having the shape of a spherical segment having a surface less than one half of the spherical member of the male element, the rotatable jaw member being displaceable relatively to the fixed jaw member by rotation in a plane about the axis of the rods when they are in alignment, a spring normally tending to hold the rotatable jaw member opposite the fixed jaw member for holding the spherical member between the jaw members, and means for compressing the spring by hand to bring the jaw members into contact with one another to provide a space of a sufficient size for disengaging the spherical member from the jaw members.

2. A ball and socket joint as claimed in claim 1, in which the engagement of the spherical member in the jaw and its disengagement take place in a plane perpendicular to the longitudinal axis of the jaw.

3. A ball and socket joint as claimed in claim 1, in which the spherical segments of the two parts of the jaw of the female element are out of center relatively to the spherical member of the male element for constituting an automatic taking up of the play.

4. A ball and socket joint comprising two control rods one of which is manually operated, a male element in the form of a spherical member arranged at the end of the manually operated control rod, a female element arranged on the other rod and constituted by a sheath having at its end a groove, a jaw composed of two parts arranged in the sheath one of which is rigid with the sheath having a cavity in the form of a spherical segment bearing against a portion of the spherical member of the male element, a second part having a cavity in the form of a spherical segment bearing against another portion of the spherical member of the male element displaceable in said sheath and adapted to be brought in contact with the fixed part, a milled ring surrounding the sheath rendered rigid with the moving part of the jaw by a pin passing through the sheath and engaging in a slot formed therein, a spring secured on one side to the sheath and on the other side to the moving part of the jaw opposite the fixed part for holding the spherical member of the male element, an action by hand on the milled ring acting against the normal action of the spring bringing the moving jaw in contact with the fixed jaw thus leaving between them a space corresponding to the groove of the sheath for permitting the engagement of the spherical member in the jaw and also its disengagement.

MICHEL JOSEPH MEYER.

REFERENCES CITED

The following references are of record in the file of this patent:

UNITED STATES PATENTS

| Number | Name | Date |
|---|---|---|
| 81,346 | Crandell | Aug. 25, 1868 |
| 757,769 | Reece | Apr. 19, 1904 |
| 2,115,629 | Gurley | Apr. 26, 1938 |
| 1,086,515 | Craft | Feb. 10, 1914 |
| 1,759,109 | Graves | May 20, 1930 |
| 684,435 | Johnston | Oct. 15, 1901 |
| 993,757 | Chrysler | May 30, 1911 |
| 763,380 | Eble et al. | June 28, 1904 |
| 1,215,805 | Hopkins | Feb. 13, 1917 |
| 2,029,532 | Karcher | Feb. 4, 1936 |